3,137,656
METHOD FOR PREPARING HYDROCRACKING CATALYSTS
Harold F. Mason, Berkeley, and John W. Scott, Jr., Ross, Calif., assignors to California Research Corporation, San Francisco, Calif., a corporation of Delaware
No Drawing. Filed Apr. 8, 1960, Ser. No. 20,806
7 Claims. (Cl. 252—439)

This invention relates to the preparation of catalysts for the conversion of hydrocarbons, and more particularly, to a method of preparing high activity hydrocracking catalysts.

As is well known to those skilled in the petroleum refining art, hydrocracking is a reaction wherein mixtures of hydrocarbons are converted to lower boiling products in the presence of added hydrogen and a catalyst at elevated temperature and pressure. One of the major lines of development that has occurred in the hydrocracking field has been the employment of catalysts comprising acidic supports having a hydrogenating component disposed thereon, and it is to this type of conversion process that the catalyst of the present invention has particular utility.

It has now been found that superior, highly active hydrocracking catalysts can be prepared by a particular sequence of preparation steps involving a combination of heat treating and haliding under critical conditions.

According to the present invention, high activity hydrocarbon conversion catalysts are prepared by a method that comprises impregnating an active siliceous cracking support with from about 1 to 35 percent by weight of nickel and/or cobalt, heat treating the catalyst resulting from such impregnation at a temperature in the range of from about 1200° to 1600° F. while said nickel and/or cobalt is substantially in the oxidized form, and subsequently contacting such heat-treated catalyst with at least one anhydrous halide of a concentration such that at least 0.5 weight percent of the final catalyst is composed of at least one halide.

The support employed in the catalyst preparation of the present invention, herein referred to as an active siliceous cracking support includes any natural or synthetic siliceous composition of acid character which is effective for the cracking of hydrocarbons and which contains at least about 40 percent by weight of silica, calculated as $SiO_2$. Illustrative of the cracking supports that can be employed are those natural cracking catalysts such as bentonite and kaolin clays, and the conventional synthetic catalysts such as silica-alumina, silica-magnesia, silica-zirconia, and silica-alumina-zirconia. In addition, satisfactory supports are the synthetic metal aluminum silicates (such as the syntheic chabazites commonly referred to as "molecular sieves") that impart the necessary cracking activity to the catalyst. A preferred active siliceous component for use in the catalyst of this invention is comprised of synthetically prepared composites of silica and alumina containing from 70 to 99 percent of the silica component.

The above-noted siliceous cracking catalysts, which form the support of the present catalyst, can be prepared by any known method. For example, synthetic silica-alumina composites can be prepared by combining an aqueous solution of an aluminum salt, suitably adjusted in acidity with a solution of sodium silicate under such conditions that the corresponding gels are coprecipitated in intimate admixture. Or, silica gel and alumina gel can be separately prepared and then mixed in the desired proportions. Alternatively, a formed silica gel can be treated with an aqueous solution of an aluminum salt, and the alumina precipitated in the silica gel by the addition of a precipitant. In another method, the silica-alumina can be prepared by first forming an acid-stabilized silica sol and then adding an adsorptive alumina to raise the pH and cause the gelation of the mixture.

After preparation of the siliceous cracking component, the latter is preferably impregnated with an aqueous solution of a water-soluble salt of cobalt and/or nickel, with the latter preferred. The concentration of the salt in this solution and the quantity of solution used to impregnate the support being such that from 1 to 35 percent, and preferably 2 to 25 percent, of cobalt and/or nickel is disposed on the cracking support. Representative salts which may be employed to effect said impregnation are the chlorides, nitrates and acetates of nickel or cobalt, although other decomposable salts may be employed if desired, including various metallo-organic compositions such as the chelates. After impregnation, the metal upon the support is substantially converted to the oxidized form in order to prevent damage at the relatively high temperatures employed in the thermactivation step described below. This can be accomplished by drying the metal salt and converting it to the oxide, as by calcining at temperatures on the order of 900° to 1100° F. Another method is to convert the salt to the oxide in the thermactivator by heating the metal salt gradually up to the thermactivation temperatures. In any case, the important feature is that the metal be substantially in the oxidized form when it undergoes thermactivation temperatures. Instead of following the foregoing impregnation procedure, the cobalt and/or nickel salts can be incorporated in the siliceous catalyst component as the same is being formed, in which case the composition is also dried and calcined to form the metal oxides. The catalyst can be used in the form of pellets, beads, extruded or other particle shapes. Thus, good results have been contained with a catalyst mass made up of small beads having an average diameter of about ⅛ inch, as well as with a crushed aggregate prepared from said beads. Good results are also obtained when the catalyst is ground to a fineness suitable for "fluidized" operations.

The resulting impregnated support is then subjected to a heat-treating (thermactivation) step, whereby it is heated to a temperature in the range of from about 1200° to 1600° F. and preferably in the range of from about 1300° to 1550° F. This heat-treating step can be conducted in several ways. The preferred method is to contact the particulate, substantially oxidized impregnated support with a relatively dry (having a water vapor partial pressure of less than about 0.5 p.s.i.a.), nonreducing gas such as air, nitrogen, or carbon dioxide at a rate which is preferably at least 10 cu. ft. per hour per cu. ft. of catalyst (10 VHSV) at a temperature within the noted range and at a pressure which can be atmospheric, or superatmospheric. Additionally, thermactivation can be done by contacting the catalyst mass at a temperature of from 1200° to 1600° F. under a pressure of less than about 1 millimeter of mercury absolute. In either method, the contact time should extend over a period of from about 0.25 to 48 hours. When lower temperatures of the 1200° to 1600° F. range are employed, say from 1200° to 1350° F., contact periods over 24 hours are particularly effective; whereas at the higher temperatures of 1500° and 1600° F., periods of from 60 minutes are more appropriate.

The resulting heat-treated catalyst can then be subjected to a haliding step which involves contacting the catalyst with at least one anhydrous halide of such concentration and under such conditions of temperature and pressure that at least 0.5 weight percent of the final catalyst is composed of at least one halide. The main requirement, insofar as the type of halide employed, is that the halide-containing compound be anhydrous. It has been found that when aqueous halide agents are employed, the catalyst activity is not appreciably enhanced and is, in fact, more often reduced to a point lower than the activity of the heat-treated form of the catalyst before haliding. Thus, it has been found that the activity of the thermactivated catalyst can only be increased by the inclusion of a halide by contact with an anhydrous halide. In addition, following treatment with the anhydrous halide, the catalyst must not be contacted with water in any form (such as by washing or by water contained in reaction feed or recycle streams) or subjected to temperatures in excess of about 1000° F. If either is done, the catalyst activity increases obtained by the present method are largely dissipated.

The haliding step may be accomplished in a variety of ways. Thus, satisfactory results have been obtained by heating the aforenoted heat-treated catalyst (the hydrogenating component being in the form of the metal oxide) with an ammonium halide in nitrogen at an elevated temperature (900° F.); by treating the thermactivated catalyst with hydrogen to reduce the metal component and thereafter contacting it with an anhydrous hydrogen halide gas; and by inserting the thermactivated catalyst in a catalytic reactor and contacting it therein with an organic halide over temperature ranges of from about 550° to 700° F. From the diverse nature of these methods it can be seen that any procedure whereby the heat-treated catalyst can be contacted with an anhydrous halide of sufficient concentration to be incorporated within the subject catalyst in the desired amount is satisfactory.

Although catalyst activity increases have been obtained by the use of chlorides and bromides, it has been found that larger activity increases have resulted when anhydrous fluorides are employed and, for that reason, these latter constitute the preferred haliding agents.

As hereinbefore noted, the catalyst preparation method of the present invention produces a hydrocarbon conversion catalyst of enhanced activity. Inasmuch as the subject catalyst has particular utility in hydrocracking reactions, this enhanced activity can best be shown by a test employing such a reaction. In this test, the so-called "activity index" of each catalyst can be determined and compared. It must be emphasized that the differences in activity index levels are highly significant and are not linear in function. Thus, to take a particular operation wherein an essentially nitrogen-free cracked naphtha boiling between about 360° and 450° F. is passed along with 6500 standard cubic feet (s.c.f.) of hydrogen per barrel of feed over the catalyst at an LHSV of 1, a pressure of 1200 p.s.i.g. and an average catalyst temperature of 550° F., it is found that a catalyst having an activity index of 14 gives a per pass conversion of said feed to valuable fuel products boiling below 360° F. (i.e., a synthetic product) of 20 percent. Under these same conditions, catalysts with activity indices of 21 and 28 will give per pass conversions of 49 percent and 56 percent, respectively. Thus, it can be seen that what may appear to be a nominal increase in the activity index is, in fact, one of considerable importance, the difference being not merely one of degree but of kind.

The test to determine the activity index of the catalyst broadly involves a determination of the conversion of a standard and readily obtainable hydrocarbon feed stock of defined physical and chemical characteristics to products falling below the boiling point of said stock under defined operating conditions. The feed stock employed is a catalytic cycle oil recovered as a distillate fraction from the effluent of a fluid type of catalytic cracking unit, the recovered fraction being one containing essentially equal proportions of aromatics and of paraffins plus naphthenes, and boiling over a range of from approximately 400° to 575° F., as determined by ASTM D–158, prior to any hydrofining treatment given the feed to reduce its basic nitrogen content to a level below 5 p.p.m., this being the maximum amount permitted in the test feed. The specific test feed employed in obtaining the activity index values of all catalysts given herein was obtained from a fluid catalytic cracking unit being charged with a mixture of light and heavy gas oils cut from a Los Angeles Basin crude. This cycle oil test feed had a gravity of 28° API, an ASTM D–158 start of about 400° F., and a basic nitrogen content of about 175 p.p.m. The test stock was hydrofined by passing the same along with 3500 s.c.f. hydrogen per barrel of naphtha through a hydrofining catalyst containing cobalt oxide (2 percent cobalt) on a coprecipitated molybdena-alumina (9 percent molybdenum) support at a pressure of 800 p.s.i.g., an LHSV of 1, and at a temperature between 700° F. and 750° F. This hydrofining operation was accompanied by a hydrogen consumption of 300 to 400 s.c.f. hydrogen per barrel of feed and resulted in a reduction of the basic nitrogen content in the liquid effluent to less than 5 p.p.m. The hydrofined test stock had the following inspections.

TABLE I

*Inspections of Hydrofined Cycle Oil Test Sample*

| | |
|---|---:|
| Gravity, ° API | 30 |
| Aniline point, ° F | 93 |
| Nitrogen (basic), p.p.m | Below 5 |
| Aromatics, vol. percent | 48 |
| Olefins, vol. percent | 1 |
| Paraffins plus naphthenes, vol. percent | 51 |
| ASTM Distillation (D–158): | |
| Start | 357 |
| 5% | 420 |
| 10% | 434 |
| 30% | 460 |
| 50% | 476 |
| 70% | 493 |
| 90% | 519 |
| 95% | 532 |
| End point | 570 |

The equipment employed in determining the activity index of the catalyst is a conventional continuous feed pilot unit, operated once-through with hydrocarbon feed and hydrogen gas. It consists of a cylindrical reaction chamber operated downflow with a preheating section, followed by a section containing the catalyst under test, and enclosed in a temperature controlled metal block to permit controlled temperature operation, together with the necessary appurtenances, such as feed burettes, feed pump, hydrogen supply, condenser, high-pressure separator provided with means for sampling the gas and liquid phases, back pressure regulators, and thermocouples. For accuracy in hydrogen fed, hydrogen is compressed into a hydrogen accumulator or burette whence it is fed to the reactor by displacement with oil fed at constant rate from a reservoir by means of a pump.

In testing a catalyst to determine its activity index, the foregoing hydrofined cycle oil test stock, along with 8000 s.c.f. $H_2$ per barrel of feed, is passed through a mass of catalyst (65 ml. were actually employed) at a liquid hourly space velocity of 2 and at a furnace temperature of 610° F., the actual feed rate employed being 130 ml. per hour. The run is continued for 14 hours under these conditions, with samples being collected at about two-hour intervals. These samples are allowed to flash off light hydrocarbons at ambient temperature and pressure, following which a determination is made of the API gravity of each sample. The aniline point of the samples may also be determined when it is desired to obtain an indication of the relative tendency of the particular catalyst to hydrogenate aromatics present in the feed. The individual API gravity values are then plotted and a smooth curve is drawn from which an average value may be obtained. Samples collected at the end of the eighth hour of operation are usually regarded as representative of steady-state operating conditions and may be distilled to determine conversion to product boiling below the initial boiling point of the feed. This conversion under steady test conditions is a true measure of the activity of the catalyst. However, the API gravity rise, that is, the API gravity of the product sample or samples minus the API gravity of the feed, is a rapid and convenient method of characterizing the catalyst which correlates smoothly with conversion. For convenience the foregoing API gravity rise is referred to as the activity index of the catalyst.

The activity index values employed herein are of the 610° F. variety unless otherwise noted, said temperature being that of the test described above. However, certain catalysts are activity index tested at 570° F. The gravity rise values so obtained may be converted to 610° F. values by correlation using data obtained by testing the same catalysts at both temperatures or can be used directly in activity comparisons. In the latter case, it is obvious that the same catalyst will have a lower 570° F. activity index than one taken at 610° F.

While reference has been made above to the use of a particular catalytic cycle stock in connection with determining the activity index of the catalyst, it is believed that similar activity index values can be obtained with catalytic cycle stocks obtained from other than California crudes provided the sample employed as feed has substantially the same characteristics as that of the feed described above. While the use of such other test feeds may give slightly different absolute values than those described herein, such differences are without influence on conclusions reached relating to catalyst activity inasmuch as the test stock is serving primarily as a relative standard by which to judge the conversion activity of the catalyst.

EXAMPLE I

A quantity of synthetic silica-alumina (about 90 percent by weight silica and about 10 percent by weight alumina) cracking catalyst beads were crushed to above 8 to 14 mesh and were then impregnated with 2.5 weight percent nickel by a nickel nitrate solution. The impregnated silica-alumina composite (the support) was dried and the nickel salt converted to the oxide by calcining at about 1000° F. A portion of the resulting catalyst (Catalyst A) was set aside and the remainder was heat treated by passing air through the catalyst at a VHSV of about 25 at a temperature of 1400° F. for a period of 24 hours. A portion of this thermactivated catalyst (Catalyst B) was set aside and the remainder was split into two portions and each subjected to a haliding step. One of the latter portions (Catalyst C) was heated (with the nickel in the form of the oxide) with $NH_4F$ vapor in nitrogen at 900° F. This catalyst contained about 3.0 weight percent fluoride. The last portion of thermactivated catalyst (Catalyst D) was contacted at 1200 p.s.i.g. with flowing hydrogen at about 610° F. to reduce the nickel oxide and was then treated with anhydrous HF gas at a temperature of 750° F. Catalyst D contained about 1.6 weight percent fluoride. All four catalysts were then contacted with a mixture of dimethyl disulfide and hydrogen to substantially convert all of the nickel present on the catalysts to the sulfide. All of the catalysts were then tested as hereinbefore described and their activity indices determined by the 610° F. activity test. The results are shown in Table II below. It might be noted that following calcining of the nickel impregnated support with the nickel nitrate solution, none of the four catalysts came into contact with appreciable amounts of water in any form.

TABLE II

| Catalyst: | 610° F. activity index |
|---|---|
| A | 14.0 |
| B | 21.0 |
| C | 27.9 |
| D | 26.1 |

The considerable superiority in activity of the catalysts (C and D) prepared by the method of the present invention is readily apparent.

EXAMPLE II

Three catalysts (E, F, and G) were prepared in the manner of the present method up to the haliding step. That is, crushed silica-alumina (90 percent to 10 percent by weight, respectively) were impregnated with about 2.5 weight percent nickel, dried and calcined at about 1000° F. and thermactivated at 1400° F. for 10 hours or more in a stream of air. At this stage, these three catalysts had 610° F. activity indices the same as Catalyst B in Example I, namely 21.

Catalyst E was subjected to a haliding step by contacting the catalyst mass with a 5 percent aqueous solution of HF. Following haliding, excess HF solution was washed off by repeated washings with cold water. The catalyst was calcined at 1000° F. reduced and sulfided with a mixture of dimethyl disulfide and hydrogen at 610° F.

The same procedure of producing the finished Catalyst E was employed in producing Catalyst F, except that the water washing step following aqueous fluoriding was omitted.

Catalyst G, prepared in all respects to the method of the invention, was halided by contact with anhydrous HF gas and the nickel component converted to the sulfide by a mixture of hydrogen and dimethyl disulfide.

Catalysts E, F, and G were then subjected to the 610° F. activity test hereinbefore described. The activity indices are shown in Table III below.

TABLE III

| Catalyst: | 610° F. activity index |
|---|---|
| E | 16.0 |
| F | 22.7 |
| G | 26.1 |

From the above table, it can be seen that when an aqueous haliding step, coupled with a subsequent water wash, is employed, the catalyst (E) has an activity index (16.0) even less than the catalyst that has only been thermactivated (activity index equal to 21). Further, when an aqueous fluoriding is employed, even without the water washing, the catalyst (F) has an activity index (22.7) only slightly better than the catalyst produced by thermactivation without haliding. Catalyst G, prepared in accordance with the method of the invention, has an activity index considerably above all of the others, thus stressing the importance of anhydrous haliding in the absence of subsequent contact with water.

EXAMPLE III

In this example, Catalyst D from Example I is compared with two other catalysts in which the order of preparation was altered from the subject method. Thus, under essentially identical conditions of nickel impregnation, the thermactivation and haliding, Catalyst H was produced in which the order of preparation was (1) nickel impregnation, (2) fluoriding, and (3) thermactivation. Catalyst I was produced by (1) fluoriding, (2) nickel impregnation, and (3) thermactivation. All of the catalysts, with the nickel present in the form of the sulfide, were subjected to the 610° F. activity test. The resulting activity indices are shown in Table IV.

TABLE IV

| Catalyst: | 610° F. activity index |
|---|---|
| D | 26.4 |
| H | 0.7 |
| I | 0.6 |

The importance of preparing the subject catalysts by the sequence of steps of the present invention is obvious.

EXAMPLE IV

A quantity of thermactivated catalysts was prepared in the same manner as Example I, except that the metal content was 15 weight percent. The 570° F. activity index of these heat-treated catalysts was 14.2. Three samples of the catalyst were then contacted with anhydrous organic halides at a temperature of 570° F. The amount of halide added to each catalyst sample was in approximately equal molar proportions. Catalyst J was contacted with chlorobenzene, Catalyst K with bromobenzene, and Catalyst L with fluorobenzene. The catalysts were sulfided and each subjected to a 570° F. activity determination, the results of which are shown in Table V below.

TABLE V

| Catalyst | 570° F. Activity Index | Wt. Percent Halide Content of Catalyst |
|---|---|---|
| Thermactivated only | 14.2 | 0 |
| J | 15.7 | 10.1 |
| K | 20.8 | 21.4 |
| L | 52.0 | 5.9 |

From the above table, it can be seen that whereas catalyst activity increases can be realized with both chlorinated and brominated compounds, the fluorided catalysts give remarkable increases, particularly as the amount of the metallic component (nickel in this case) is increased.

EXAMPLE V 9000 ml. of a synthetic silica (87 weight percent)-alumina (13 weight percent) composite cracking catalyst support was prehumidified for 48 hours with water. The support was then impregnated with 2601 grams of nickel acetate dissolved in 7200 ml. of water for 24 hours at room temperature. The metal impregnated support was dried for 10 hours at 250° F. and then thermactivated at 1400° F. for 4 hours using dry air at a rate of 9 cu. ft. per hour. The metal content of the resulting nickel oxide thermactivated catalyst was 3 weight percent (as the metal). 50 ml. of this catalyst was then reduced by contacting the catalyst with flowing hydrogen at a temperature of 570° F. for 30 minutes. The metal was then converted to the sulfide by contacting the catalyst, at a temperature of 570° F. and a pressure of 1200 p.s.i.g. with 12,000 s.c.f. of hydrogen per barrel of sulfiding solution (10 volume percent dimethyl disulfide in mixed hexanes) for 1 hour. The 570° F. activity index of this sulfided catalyst was 13.5.

A portion of the sulfided catalyst was then fluorided by contacting the catalyst for 1 hour at 570° F. with 5 volume percent fluorobenzene in mixed hexanes along with 12,000 s.c.f. of hydrogen. The finished catalyst had a fluoride content of about 1 weight percent and a 570° F. activity index of 19.1.

From the above examples, it can be seen that vastly improved hydrocracking catalysts can be prepared by the method of the present invention. Although the catalysts exemplified herein are of the preferred type, that is, the metal being in the form of the sulfide, it must be understood that comparable improvements in hydrocracking activity can be attained with the metal in other forms, such as the oxides, which are well known hydrocracking catalysts.

With respect to the sulfided catalysts of this invention, it must be noted that the sulfiding step can be done during various stages of the catalyst preparation. Thus, sulfiding can be done after thermactivation and haliding (Example I) and also after thermactivation but before haliding (Example V).

We claim:

1. The method of preparing a hydrocarbon conversion catalyst which comprises impregnating an active siliceous cracking support with at least one metal salt selected from the group consisting of the salts of nickel and cobalt in an amount such that there is disposed on said support from about 1 to 35 percent by weight of said metal, calcining the resulting impregnated support to substantially convert said metal salt to the corresponding metal oxide, heat treating the catalyst resulting from such impregnation and calcination at a temperature in the range of from about 1200° to 1600° F. while said metal is substantially in the oxidized form, and subsequently contacting such heat-treated catalyst with at least one anhydrous halide of a concentration such that at least 0.5 weight percent of the final catalyst is composed of at least one halide.

2. The method of claim 1 wherein the heat-treating step is conducted for a period of from about 0.25 to 48 hours.

3. The method of claim 1 wherein said metal of impregnation is at least partially converted to the corresponding sulfide by contact with at least one anhydrous sulfur-containing compound after said haliding step.

4. The method of claim 1 wherein said metal added to said support by impregnation is at least partially converted to the corresponding sulfide by contact with at least one anhydrous sulfur-containing compound after said heat-treating step and prior to said haliding step.

5. The method of claim 1 wherein said metal of impregnation is at least partially reduced to the corresponding metal by contact with a hydrogen-containing gas at a temperature below about 1000° F. after said haliding step.

6. The method of claim 1 wherein the siliceous cracking support comprises from 70 to 99% by weight silica.

7. A hydrocarbon conversion catalyst consisting essentially of a composite of an active siliceous cracking support, together with at least one hydrogenating component selected from the group consisting of cobalt, nickel, and their oxides, the activity of said catalyst having been enhanced by the steps comprising (1) calcining the support-hydrogenating component composite so as to substantially convert said hydrogenating component to its corresponding oxide, (2) heat treating the calcined composite at a temperature in the range of from about 1200° to 1600° F., and (3) treating the resulting heat-treated composite with at least one anhydrous halide, the concentration of said halide being such that at least 0.5 weight percent of the final catalyst is composed of at least one halide.

References Cited in the file of this patent

UNITED STATES PATENTS

| 2,194,186 | Pier et al. | Mar. 19, 1940 |
| 2,606,940 | Bailey et al. | Apr. 12, 1952 |
| 2,744,148 | Ruh et al. | May 1, 1956 |
| 2,746,907 | Hanson | May 22, 1956 |
| 2,913,421 | Horne et al. | Nov. 17, 1959 |
| 3,078,238 | Beuther et al. | Feb. 19, 1963 |

UNITED STATES PATENT OFFICE
CERTIFICATE OF CORRECTION

Patent No. 3,137,656                              June 16, 1964

Harold F. Mason et al.

It is hereby certified that error appears in the above numbered patent requiring correction and that the said Letters Patent should read as corrected below.

Column 1, line 52, for "syntheic" read -- synthetic --; column 2, line 33, for "contained" read -- obtained --; line 61, after "from" insert -- 15 to --; column 4, line 50, for "fed" read -- feed --; line 75, for "piont" read -- point --.

Signed and sealed this 17th day of November 1964.

(SEAL)
Attest:

ERNEST W. SWIDER                          EDWARD J. BRENNER
Attesting Officer                               Commissioner of Patents